(12) United States Patent
Naiki et al.

(10) Patent No.: US 12,519,149 B2
(45) Date of Patent: Jan. 6, 2026

(54) HEAT MEASUREMENT DEVICE

(71) Applicant: Prime Planet Energy & Solutions, Inc., Tokyo (JP)

(72) Inventors: Daisuke Naiki, Kasai (JP); Kouji Takuwa, Himeji (JP); Hiroyuki Hashimoto, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 926 days.

(21) Appl. No.: 17/715,904

(22) Filed: Apr. 7, 2022

(65) Prior Publication Data

US 2022/0328892 A1 Oct. 13, 2022

(30) Foreign Application Priority Data

Apr. 8, 2021 (JP) ................................ 2021-065859

(51) Int. Cl.
*H01M 10/48* (2006.01)
*H01M 50/202* (2021.01)
*H01M 50/227* (2021.01)

(52) U.S. Cl.
CPC ....... *H01M 10/486* (2013.01); *H01M 50/202* (2021.01); *H01M 50/227* (2021.01)

(58) Field of Classification Search
CPC .... H01M 10/486; H01M 10/48; H01M 50/20; H01M 50/202; H01M 50/207; H01M 50/209; H01M 50/227; H01M 50/271; H01M 50/273; H01M 50/278
See application file for complete search history.

(56) References Cited

U.S. PATENT DOCUMENTS

| 2012/0262109 | A1* | 10/2012 | Toya | H01M 10/44 |
| | | | | 320/108 |
| 2016/0111693 | A1* | 4/2016 | Reitzle | H01M 10/486 |
| | | | | 429/94 |
| 2018/0254651 | A1* | 9/2018 | Hallmark | H02J 7/0013 |
| 2019/0090345 | A1* | 3/2019 | Ebihara | H05K 3/4652 |
| 2021/0344062 | A1 | 11/2021 | Takeda et al. | |

FOREIGN PATENT DOCUMENTS

| CN | 101142701 A | * | 3/2008 | ........... G01R 31/374 |
| CN | 109001252 A | | 12/2018 | |
| JP | 2015-102420 A | | 6/2015 | |
| PL | 196377 B1 | * | 12/2007 | |
| WO | 2020/054227 A1 | | 3/2020 | |

* cited by examiner

*Primary Examiner* — Nicholas A Smith
*Assistant Examiner* — Michael R. Worden
(74) *Attorney, Agent, or Firm* — HAUPTMAN HAM, LLP

(57) ABSTRACT

A heat measurement device includes: a high-heat portion disposed on a first end portion in the power storage device; a low-heat portion disposed on a second end portion in the power storage device; a first temperature sensor disposed on the first end portion in the power storage device; a second temperature sensor disposed on the second end portion in the power storage device; and a cover member that is provided to cover at least a portion of a side surface of the power storage device located between the first end portion and the second end portion and that holds the power storage device. The cover member includes an inner surface facing the side surface of the power storage device, and a rib that protrudes from the inner surface and that is in abutment with the side surface of the power storage device.

16 Claims, 7 Drawing Sheets

HEAT MEASUREMENT DEVICE

This nonprovisional application is based on Japanese Patent Application No. 2021-065859 filed on Apr. 8, 2021, with the Japan Patent Office, the entire contents of which are hereby incorporated by reference.

BACKGROUND OF THE INVENTION

Field of the Invention

The present technology relates to a heat measurement device.

Description of the Background Art

A conventional heat measurement device is described in, for example, Japanese Patent Laying-Open No. 2015-102420.

When measuring the heat conductivity of the whole of a power storage device such as a battery, it is necessary to hold a battery cell or the like while suppressing inclination of the cell in order to improve measurement precision. In view of the above, the conventional heat measurement device does not necessarily have a sufficient configuration.

SUMMARY OF THE INVENTION

An object of the present technology is to provide a heat measurement device allowing for high measurement precision.

A heat measurement device according to the present technology is a heat measurement device that measures a heat conductivity of a power storage device, the heat measurement device including: a high-heat portion disposed on a first end portion in the power storage device; a low-heat portion disposed on a second end portion in the power storage device, the low-heat portion being located opposite to the first end portion; a first temperature sensor provided on the first end portion in the power storage device; a second temperature sensor provided on the second end portion in the power storage device; and a cover member that is provided to cover at least a portion of a side surface of the power storage device located between the first end portion and the second end portion and that holds the power storage device. The cover member includes an inner surface facing the side surface of the power storage device, and a rib that protrudes from the inner surface and that is in abutment with the side surface of the power storage device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
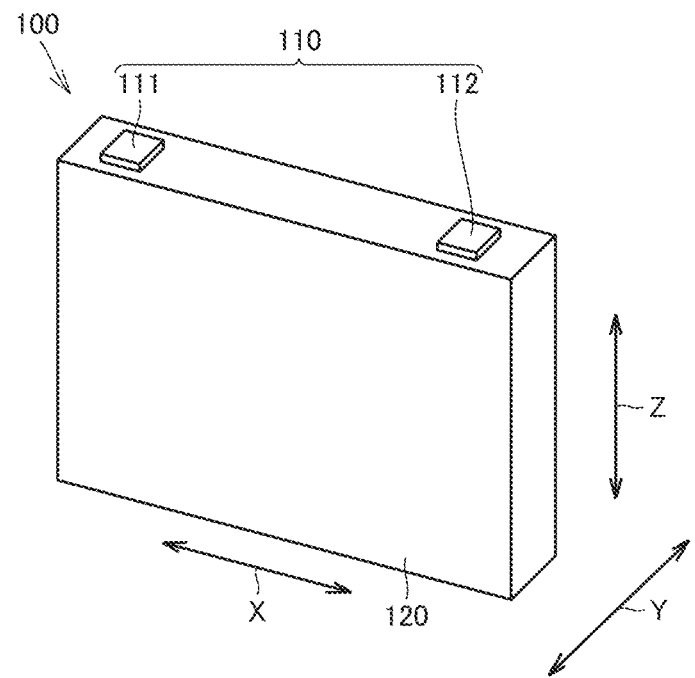
FIG. 1 is a diagram showing a battery cell.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, when the terms "power storage device", "power storage cell", "power storage module", and "power storage pack" are used, the "power storage device", the "power storage cell", the "power storage module", and the "power storage pack" are not limited to a battery, a battery cell, a battery module, and a battery pack, and can include a capacitor or the like.

FIG. 1 is a diagram showing a battery cell 100 serving as a "power storage device". As shown in FIG. 1, battery cell 100 is formed to have a shape of rectangular parallelepiped with flat surfaces. Electrode terminal 110 includes a positive electrode terminal 111 and a negative electrode terminal 112. Electrode terminal 110 is formed on a housing 120 having a prismatic shape. Housing 120 includes: an upper surface on which electrode terminal 110 is formed; a bottom surface facing the upper surface; a long side surface extending in an X-Z plane direction; and a short side surface extending in a Y-Z plane direction. Housing 120 stores an electrode assembly and an electrolyte solution. A battery pack is formed by stacking battery cells 100 in the Y axis direction.

Figure 2:
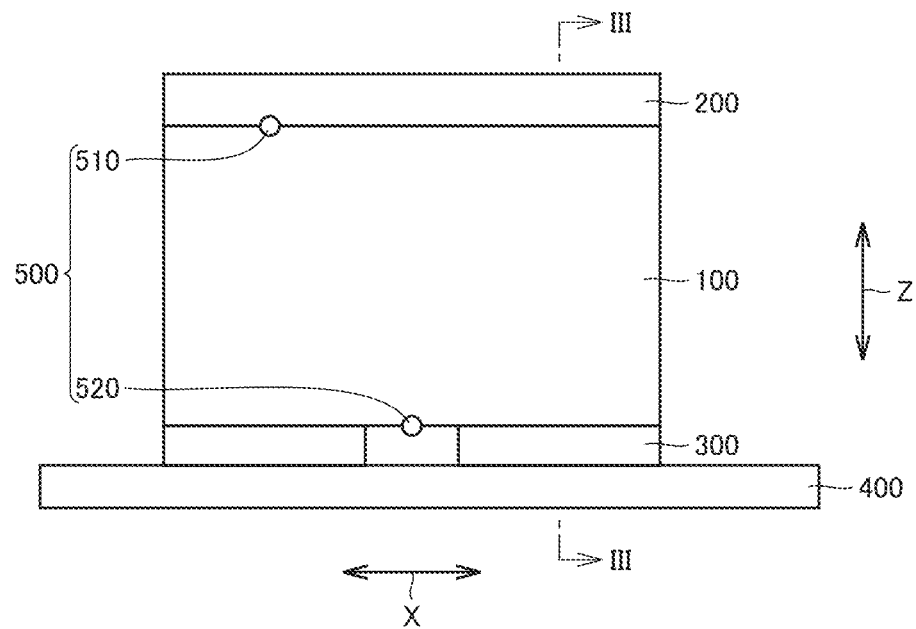
FIG. 2 is a diagram showing a configuration of a heat measurement device.
Figure 3:
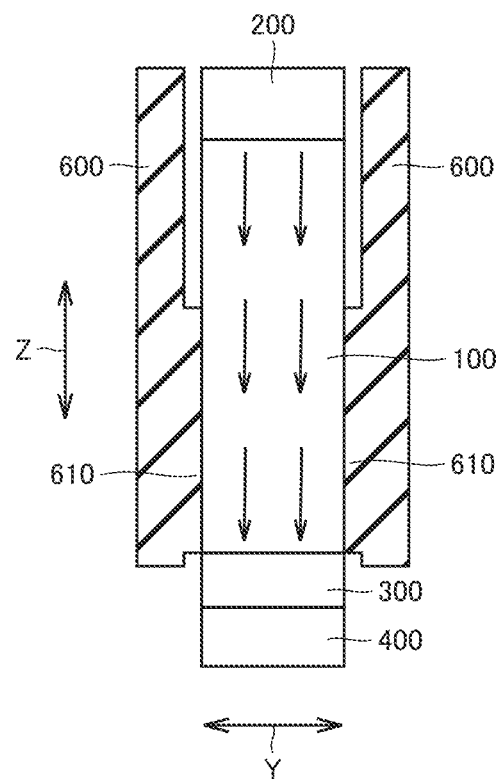
FIG. 3 is a cross sectional view taken along in the heat measurement device shown in FIG. 2.

FIG. 2 is a diagram showing a configuration of a heat measurement device. FIG. 3 is a cross sectional view taken along in the heat measurement device shown in FIG. 2. The heat measurement device is a heat measurement device that measures the heat conductivity of battery cell 100, and as shown in FIGS. 2 and 3, the heat measurement device includes: a heater 200 (high-heat portion) provided on the upper surface (first end portion) of battery cell 100; a cooling plate 400 (low-heat portion) provided on the bottom surface (second end portion) of battery cell 100 with a heat conduction sheet 300 being interposed therebetween; a temperature sensor 500 provided on each of the upper surface and bottom surface of battery cell 100; and a cell cover 600 (cover member) provided to cover the side surface of battery cell 100.

Temperature sensor 500 includes: a first sensor 510 (first temperature sensor) provided on the upper surface of battery cell 100; and a second sensor 520 (second temperature sensor) provided on the bottom surface of battery cell 100. Cell cover 600 holds battery cell 100 to stabilize the position and direction of battery cell 100.

For evaluation of the heat conductivity of battery cell 100, the heat conductivity of battery cell 100 as a whole is measured. The measurement result is used for analysis or the like to evaluate a heat radiation characteristic of a battery module including battery cell 100. For this analysis, actually measured values of the heat conductivity in three directions (the X axis direction, the Y axis direction, and the Z axis direction) are required.

Therefore, as shown in FIGS. 2 and 3, it is necessary to measure the heat conductivity in the Z axis direction in a state in which battery cell 100 stands. Heater 200 is fixed because heater 200 is fastened to a pressing block (not shown) provided above heater 200. When measuring the heat conductivity in the Z axis direction, a predetermined load is applied downward (in a direction toward cooling plate 400) from above heater 200 with the pressing block being interposed therebetween. The magnitude of the load is managed using a load cell (not shown).

As shown in FIG. 3, a rib 610 is provided to protrude from the inner surface of cell cover 600, and rib 610 is in abutment with battery cell 100. Heater 200 and cell cover 600 are separated from each other by the height of rib 610. Since heater 200 and cell cover 600 are thus separated from each other to thermally insulate heater 200 and cell cover 600 from each other by air, heat can be suppressed from being transferred from heater 200 to cell cover 600.

Figure 4:
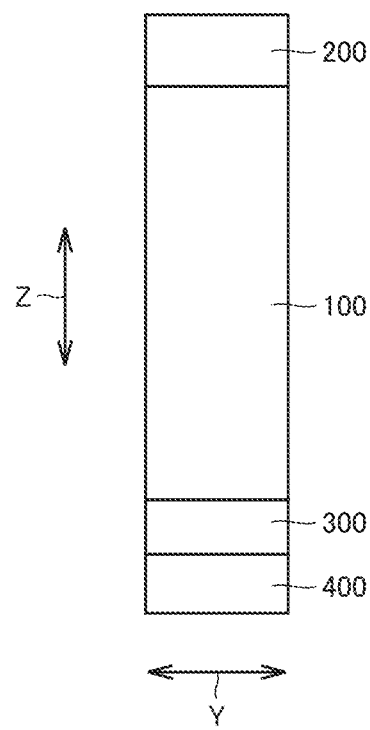
FIG. 4 is a diagram showing a heat measurement device according to a comparative example.
Figure 5:
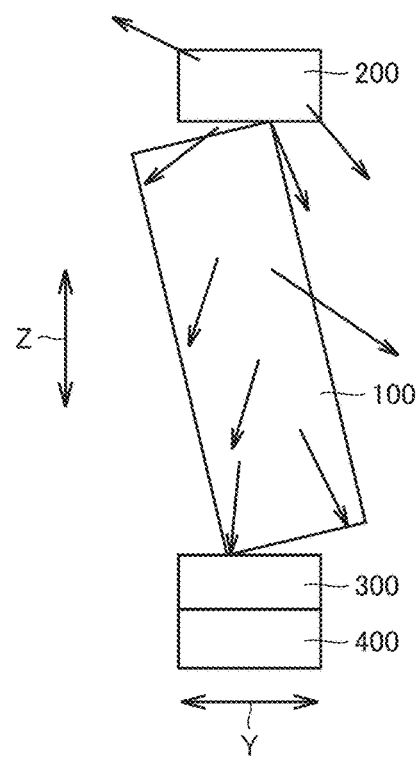
FIG. 5 is a diagram illustrating a use state of the heat measurement device shown in FIG. 4.

FIG. 4 is a diagram showing a heat measurement device according to a comparative example. FIG. 5 is a diagram illustrating a use state of the heat measurement device shown in FIG. 4. As shown in FIGS. 4 and 5, no cell cover 600 is provided in the heat measurement device according to the comparative example. Therefore, when a load is applied from above heater 200, battery cell 100 may be inclined with respect to the Z axis direction as shown in FIG. 5. Thus, a heat flow passing through battery cell 100, which is a measurement target, may not become uniform, with the result that the heat conductivity may be unable to be precisely measured.

On the other hand, in the heat measurement device according to the present embodiment, the heat conductivity can be measured with battery cell 100 being held in an upright state (a state in which battery cell 100 stands in parallel with the Z axis) by cell cover 600. As a result, a heat flow passing through battery cell 100, which is a measurement target, becomes uniform. Further, by providing cell cover 600, heat from heater 200 is facilitated to be conducted to battery cell 100. Therefore, the heat conductivity can be precisely measured.

Cell cover 600 is preferably composed of, for example, polycarbonate, more specifically, a resin such as glass fiber reinforced polycarbonate; however, the material of cell cover 600 is not limited thereto. Further, cell cover 600 preferably has a heat conductivity of about less than or equal to 0.4 W/mK, and more preferably has a heat conductivity of about less than or equal to 0.2 W/mK; however, the heat conductivity of cell cover 600 is not limited to the above range.

By setting the heat conductivity of cell cover 600 to fall within the predetermined range, heat radiation from the side surface of battery cell 100 during the measurement of the heat conductivity can be suppressed, with the result that the heat conductivity can be measured more precisely.

A heat insulating material having a heat conductivity lower than that of air may be provided between battery cell 100 and the inner surface of cell cover 600.

As shown in FIG. 3, cell cover 600 is preferably provided to extend from the upper surface of battery cell 100 to reach the bottom surface of battery cell 100 along the Z axis direction; however, cell cover 600 may be provided in a portion of battery cell 100 in the Z axis direction.

Figure 6:
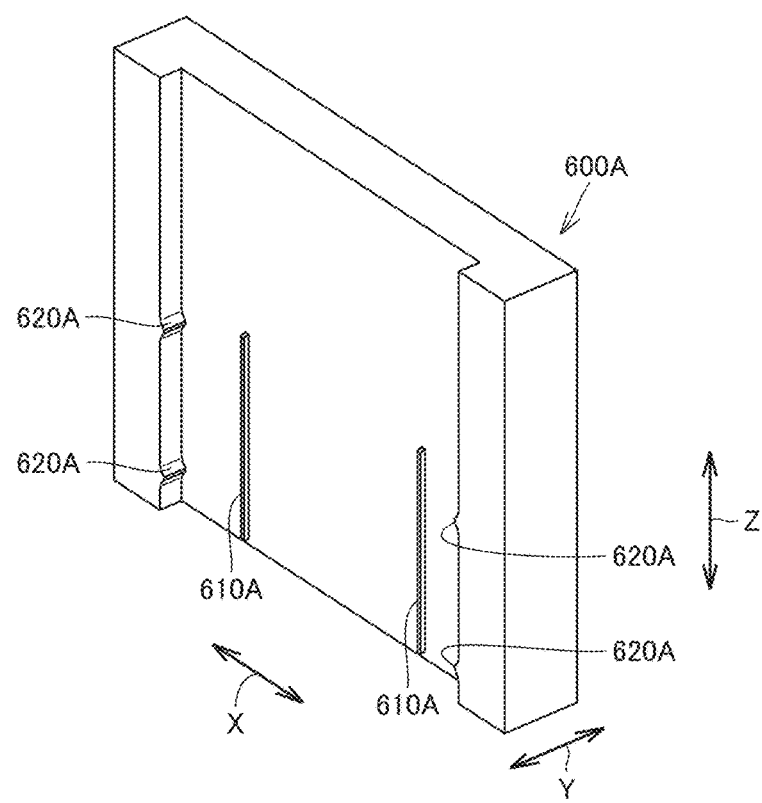
FIG. 6 is a perspective view showing an exemplary cover member.
Figure 7:
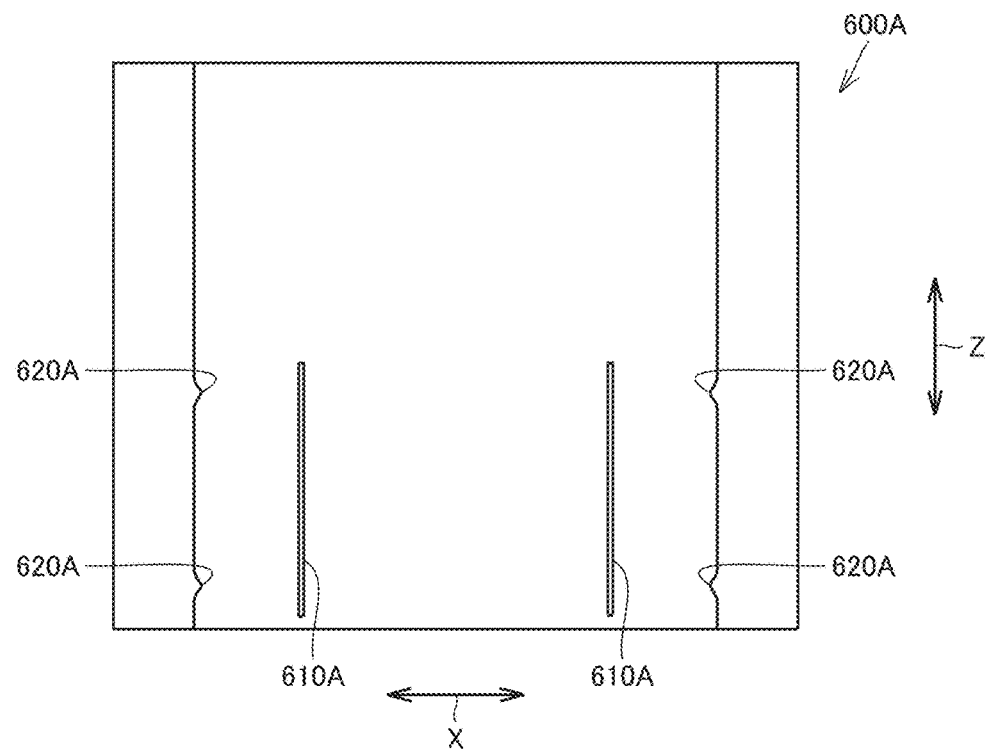
FIG. 7 is a front view of the cover member shown in FIG. 6.

FIG. 6 is a perspective view showing an exemplary cell cover 600A. FIG. 7 is a front view of cell cover 600A. By combining two cell covers 600A, a whole of the periphery of the side surface of battery cell 100 can be covered.

As shown in FIGS. 6 and 7, cell cover 600A includes ribs 610A, 620A that each protrude from the inner surface facing the side surface of battery cell 100 and that are each in abutment with the side surface of battery cell 100. Rib 610A is in abutment with the long side surface of battery cell 100 along the Z axis direction. Rib 620A is in abutment with the short side surface of battery cell 100 along the Y axis direction. The arrangement and number of ribs 610A, 620A can be appropriately changed.

Each of ribs 610A, 620A is formed to have a shape of strip or line. By providing such ribs 610A, 620A, the inclination of battery cell 100 can be suppressed while reducing a contact area between cell cover 600A and battery cell 100. As a result, heat radiation from battery cell 100 through cell cover 600A can be suppressed, with the result that the heat conductivity can be measured more precisely.

Figure 8:
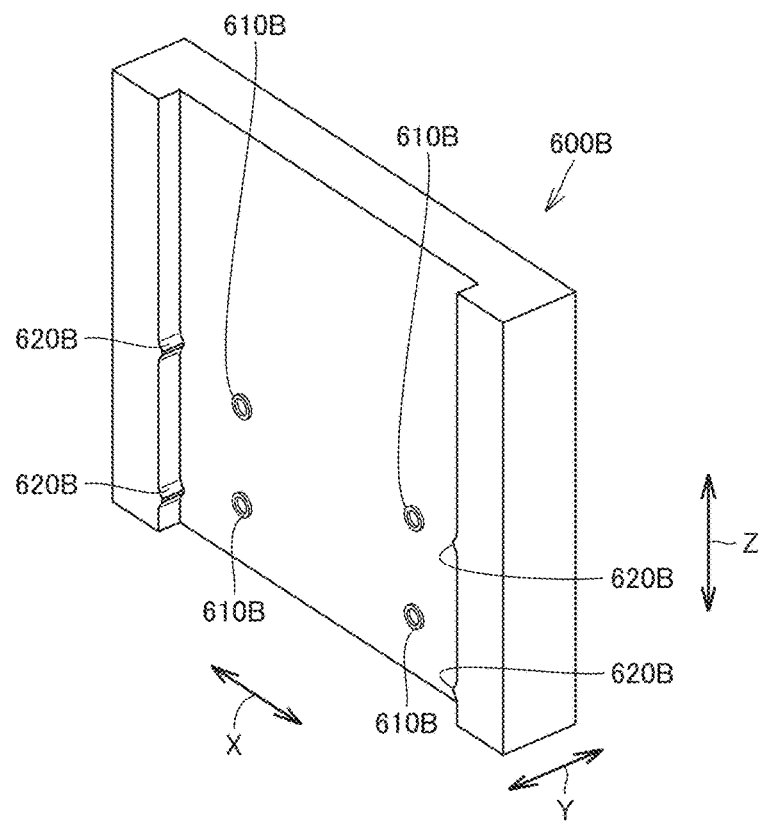
FIG. 8 is a perspective view showing a modification of the cover member.
Figure 9:
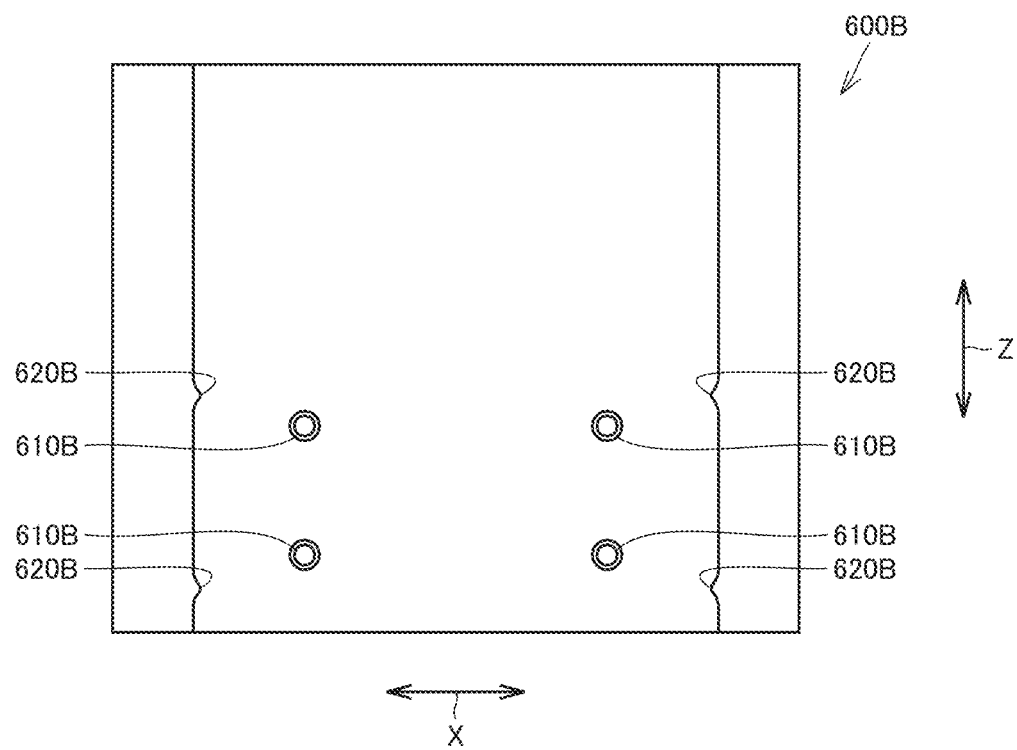
FIG. 9 is a front view of the cover member shown in FIG. 8.

FIG. 8 is a perspective view showing a cell cover 600B serving as a modification. FIG. 9 is a front view of cell cover 600B. Cell cover 600B includes ribs 610B, 620B that are each in abutment with the side surface of battery cell 100. The arrangement and number of ribs 610B, 620B can be appropriately changed.

Figure 10:
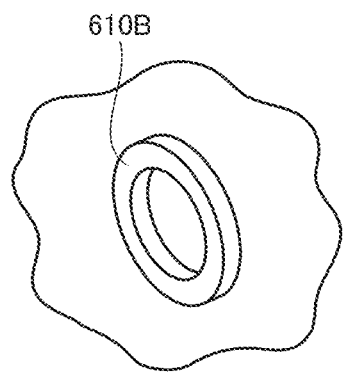
FIG. 10 is a partial enlarged view of the cover member shown in FIGS. 8 and 9.

FIG. 10 is a partial enlarged view of the periphery of rib 610B. As shown in FIG. 10, rib 610B is formed to have an annular shape. Also with such a rib 610B, the inclination of battery cell 100 can be suppressed while reducing the contact area between cell cover 600A and battery cell 100. Further, by employing rib 610B having the annular shape and providing a cavity in the central portion of rib 610B, the heat insulating property can be further improved.

Figure 11:
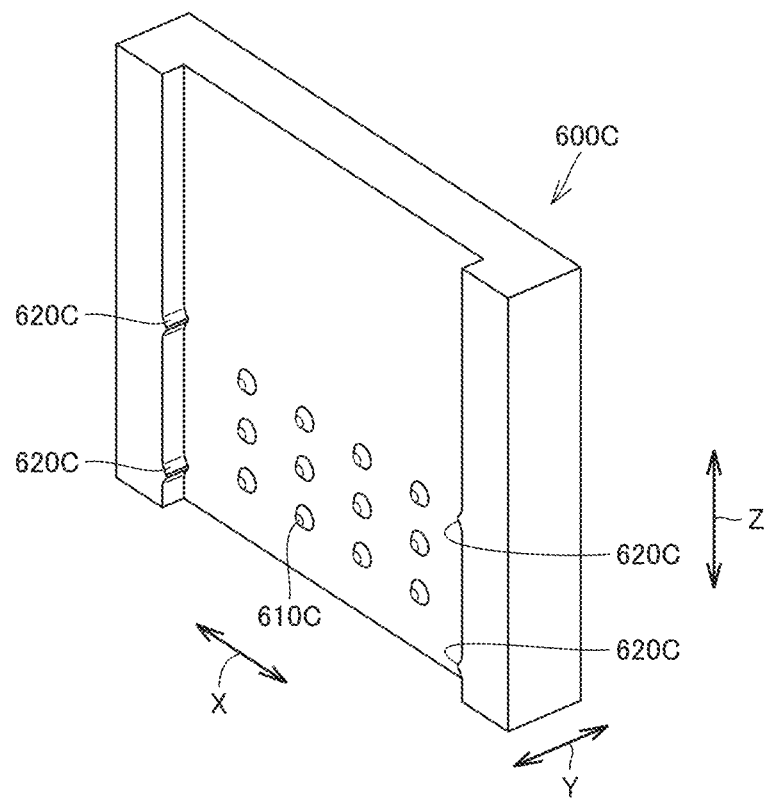
FIG. 11 is a perspective view showing another modification of the cover member.
Figure 12:
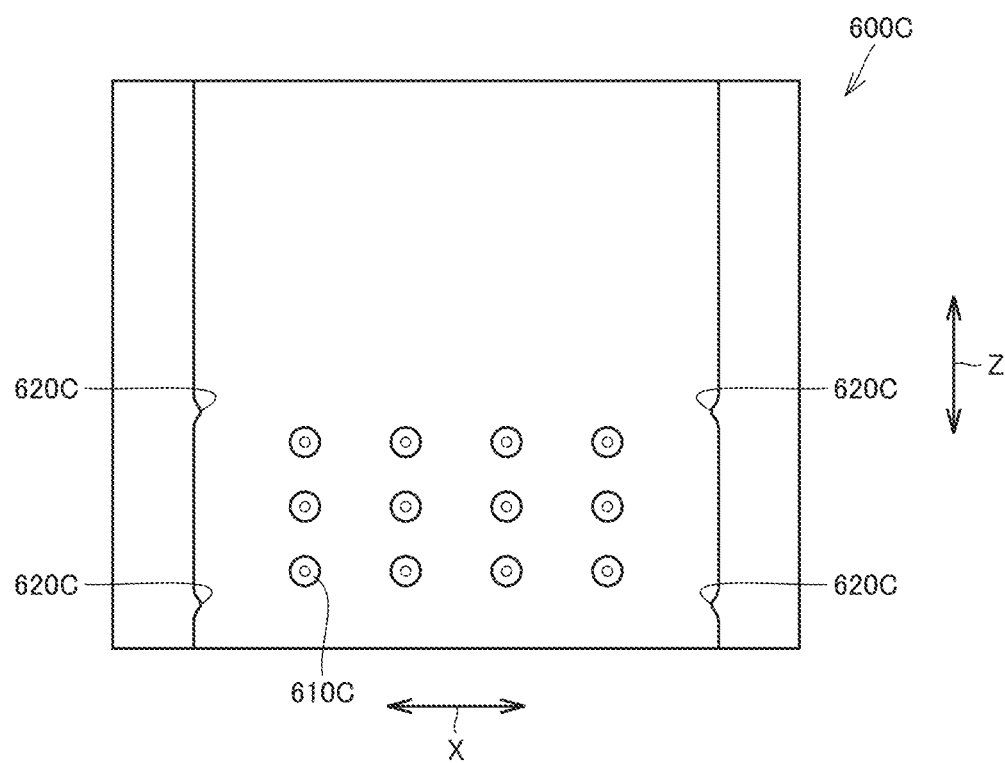
FIG. 12 is a front view of the cover member shown in FIG. 11.

FIG. 11 is a perspective view showing a cell cover 600C serving as another modification. FIG. 12 is a front view of cell cover 600C. Cell cover 600C includes ribs 610C, 620C that are each in abutment with the side surface of battery cell 100. The arrangement and number of ribs 610C, 620C can be appropriately changed.

Figure 13:
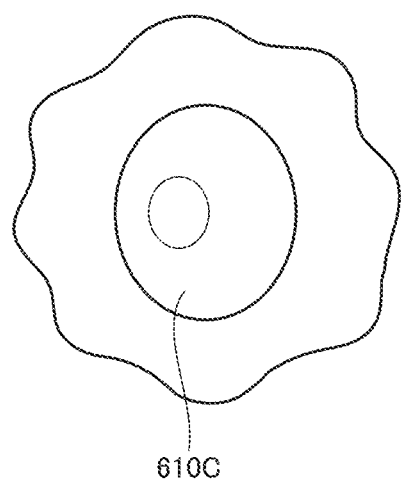
FIG. 13 is a partial enlarged view of the cover member shown in FIGS. 11 and 12.

FIG. 13 is a partial enlarged view of the vicinity of rib 610C. As shown in FIG. 13, rib 610C is formed to have a shape of curved protrusion. By using such a rib 610C, a point contact can be made between cell cover 600C and battery cell 100, with the result that the inclination of battery cell 100 can be suppressed while reducing the contact area between cell cover 600C and battery cell 100.

In the above-described example, cell cover 600 that covers the whole of the periphery of the side surface of battery cell 100 is formed by combining the two divided components, but cell cover 600 may be divided into three or more components or may be constituted of a single member.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A heat measurement device for measuring a heat conductivity of a power storage device, the heat measurement device comprising:
   a high-heat portion disposed on a first end portion in the power storage device;
   a low-heat portion disposed on a second end portion in the power storage device, the second end portion being located opposite to the first end portion;
   a first temperature sensor provided on the first end portion in the power storage device;
   a second temperature sensor provided on the second end portion in the power storage device; and
   a cover member provided to cover at least a portion of a side surface of the power storage device located between the first end portion and the second end portion, and configured to hold the power storage device, wherein
   the cover member includes
      an inner surface facing the side surface of the power storage device, and
      a rib that protrudes from the inner surface and that is in abutment with the side surface of the power storage device;
   the power storage device has a housing having a prismatic shape;
   the housing includes
      an upper surface on the first end portion, and
      a bottom surface on the second end portion, the bottom surface facing the upper surface in a first direction;
   the high-heat portion and the first temperature sensor are provided on the upper surface of the housing; and
   the low-heat portion and the second temperature sensor are provided on the bottom surface of the housing.

2. The heat measurement device according to claim 1, wherein
   the cover member is composed of a resin.

3. The heat measurement device according to claim 1, wherein
   the side surface of the power storage device includes
      a short side surface along a short-side direction, and
      a long side surface along a long-side direction, and
   the rib has a portion that is in abutment with the long side surface along the short-side direction intersecting the long-side direction.

4. The heat measurement device according to claim 1, wherein
   the side surface of the power storage device includes
      a short side surface along a short-side direction, and
      a long side surface along a long-side direction, and
   the rib has a portion that is in abutment with the short side surface along the long-side direction intersecting the short-side direction.

5. The heat measurement device according to claim 1, wherein
   the cover member extends from the first end portion to reach the second end portion in the power storage device.

6. The heat measurement device according to claim 1, wherein
   the cover member covers a whole of a periphery of the side surface of the power storage device.

7. The heat measurement device according to claim 1, wherein
   the cover member includes a plurality of components divided in a peripheral direction of the power storage device.

8. The heat measurement device according to claim 1, further comprising:
   a heat insulating material provided between the power storage device and the inner surface of the cover member.

9. The heat measurement device according to claim 1, wherein
   the cover member has a heat conductivity of less than or equal to 0.4 W/mK.

10. The heat measurement device according to claim 8, wherein
    the side surface is between the upper surface and the bottom surface in the first direction.

11. The heat measurement device according to claim 10, wherein
    the high-heat portion and the cover member are separated from each other by a height of the rib.

12. The heat measurement device according to claim 11, further comprises:
    a heat conduction sheet interposed between the high-heat portion and the low-heat portion, wherein
    the low-heat portion includes a cooling plate on the bottom surface of the housing.

13. A combination, comprising:
    a power storage device; and
    a heat measurement device for measuring a heat conductivity of the power storage device, the heat measurement device comprising:
       a high-heat portion disposed on a first end portion in the power storage device,
       a low-heat portion disposed on a second end portion in the power storage device,
       the second end portion being located opposite to the first end portion,
       a first temperature sensor provided on the first end portion in the power storage device, a second temperature sensor provided on the second end portion in the power storage device, and a cover member provided to cover at least a portion of a side surface of the power storage device located between the first end portion and the second end portion, and configured to hold the power storage device, wherein the cover member includes an inner surface facing the side surface of the power storage device, and a rib that protrudes from the inner surface and that is in abutment with the side surface of the power storage device;

the power storage device has a housing having a prismatic shape;

the housing includes an upper surface on the first end portion, and a bottom surface on the second end portion, the bottom surface facing the upper surface in a first direction;

the high-heat portion and the first temperature sensor are provided on the upper surface of the housing; and the low-heat portion and the second temperature sensor are provided on the bottom surface of the housing.

14. The combination according to claim 13, wherein the side surface is between the upper surface and the bottom surface in the first direction.

15. The combination according to claim 14, wherein the high-heat portion and the cover member are separated from each other by a height of the rib.

16. The combination according to claim 15, further comprises:

a heat conduction sheet interposed between the high-heat portion and the low-heat portion, wherein the low-heat portion includes a cooling plate on the bottom surface of the housing.

* * * * *